United States Patent [19]

Lyman

[11] 4,035,458
[45] July 12, 1977

[54] METHOD OF MAKING A COMPOSITE RIGID FOAMED CHAIR SEAT OR THE LIKE

[75] Inventor: Richard J. Lyman, Oconomowoc, Wis.

[73] Assignee: United States Gypsum Company, Chicago, Ill.

[21] Appl. No.: 582,033

[22] Filed: May 29, 1975

[51] Int. Cl.² .................................. B29D 27/04
[52] U.S. Cl. .......................... 264/46.4; 249/113; 264/46.7; 264/46.9; 264/271; 264/275; 297/458; 297/DIG. 1; 425/812; 428/314; 428/425
[58] Field of Search .................. 264/54, 46.7, 46.4, 264/265, 46.8, 250, 271, 275; 428/131, 314, 425; 249/113; 297/458, DIG. 1

[56] References Cited

U.S. PATENT DOCUMENTS

| | | | |
|---|---|---|---|
| 2,955,972 | 10/1960 | Wintermute et al. | 264/46.8 X |
| 3,116,196 | 12/1963 | Terry | 264/46.7 X |
| 3,124,627 | 3/1964 | Hood | 264/54 |
| 3,163,687 | 12/1964 | Einhorn | 428/131 X |
| 3,493,449 | 2/1970 | Krug | 264/46.4 |
| 3,531,552 | 9/1970 | Getz et al. | 264/46.7 |
| 3,557,264 | 1/1971 | Getz et al. | 264/46.7 |
| 3,608,007 | 9/1971 | Henrickson | 264/265 X |
| 3,845,183 | 10/1974 | Harrison | 264/250 X |
| 3,895,154 | 7/1975 | Kapral | 428/187 X |

*Primary Examiner*—Philip Anderson
*Attorney, Agent, or Firm*—Donnie Rudd; Kenneth E. Roberts; Samuel Kurlandsky

[57] ABSTRACT

A method for making an article such as a chair seat or the like is disclosed with the method including: attaching a rigid insert to one-half of a mold with an air permeable material extending from between the rigid insert and the mold outward toward the edges of the first half of the mold; inserting a liquid foamable reaction mixture into the cavity of a second half of the mold, placing the two mold halves together with the air permeable material extending from the cavity of the mold to the exterior thereof; allowing the reaction mixture to cure and form a rigid hard structure throughout while expanding around the sides of the rigid insert; and removing the finished article from the mold.

8 Claims, 6 Drawing Figures

METHOD OF MAKING A COMPOSITE RIGID FOAMED CHAIR SEAT OR THE LIKE

BACKGROUND OF THE INVENTION

1. FIELD OF THE INVENTION

This invention relates to a method for making an article such as a chair seat or the like in a closed cavity by expansion of a polymerizing material.

2. DESCRIPTION OF THE PRIOR ART

Many attempts have been made to produce chair seats and other such structural articles from rigid plastic materials, such as cured, rigid foams. Materials that have been found to be useful for such an approach include polyolefin foams polystyrene foams, polyester foams, polypropylene foams, and polyurethane foams. Many different methods exist for producing articles in this type of operation. Generally, when the production is such that the amount of plastic material or foam material that is used is of a large quantity, a portion of the material is replaced by some type of rigid insert which is of a lower cost, but which still provides sufficient rigidity to prevent a weakening of the article produced. Generally, such production is of the type wherein the rigid material is inserted into one-half of the mold and the foamable material is inserted into the other half, with the two halves then being placed together in order that the foamable material may expand as it cures and foam upward and around the rigid material to form a single unitary piece of rigid hard structure. Several methods exist for obtaining this goal. In U.S. Pat. No. 3,608,007, a rigid desk top or the like is produced by using a resin impregnated paper as a hard outer shell with the paper shell then filled with a polyurethane foam that is then cured to provide a solid structure. With this method, however, the gas that is formed in the reaction is retained within the structure causing it to expand, and although the structure is rigid and hard, it nevertheless has a large amount of expansion due to gases retained therein. This expansion weakens the structural strength of the article produced. In U.S. Pat. No. 3,531,552, a seat is produced with a foam cushion having a rigid insert therein for support, but ample space is provided within the cavity itself for expansion of the material, and the insert is of a nature that will allow for it to absorb the foaming gases to render the foam free of voids. Both of these processes thus make provisions within the mold cavity itself for retention of the foaming gases within the cavity. One other known method for making an integral formed seat, illustrated in U.S. Pat. No. 3,845,183, includes a process for making a seat having a rigid insert therein, although the foam material is eventually a soft material with an integral skin in order to have resiliency. In this method, the cavity is entirely closed and flashing chamber within the cavity allows for expansion of the foam material due to the generated gases. The continuous flash formed in the expansion portion of the chamber is then severed and discarded. In each of these methods, some provision within the chamber itself is made for accommodating the reaction gases within the chamber.

Perhaps the closest thing to the present invention is the teaching in U.S. Pat. No. 3,844,523. In that patent, an air permeable material is simply placed between two mold halves. In that process, however, the air permeable material must be sufficiently rigid to keep from distorting into the mold cavity thereby causing a design imperfection in the cast article. That process, however, is undesirable for certain systems since to have a material of sufficient rigidity to extend across a large cavity requires a material of reduced gas permeability. In the present invention, the lack of rigidity over large cavity expanses is overcome by a rigid insert which is attached to the air permeable material to additionally support it and with the rigid insert thereafter becoming an integral part of the molded article.

The new and novel method of this invention provides a system for removal of the expansion gases from the mold cavity without allowing the polymer material to expand out of the mold cavity thus providing a rigid system, hard and solid throughout, which has the strength and appearance of hardwood.

SUMMARY OF THE INVENTION

It is an object of this invention to provide a method for making an article, such as a chair seat or the like, from foamable reaction mixtures.

It is an additional object of this invention to provide a method for making an article, such as a chair seat or the like, which gives the appearance and strength of hardwood.

It is an additional object of this invention to provide a method for making an article, such as a chair seat or the like, with the method providing a minimum of loss of material due to expansion of the reacting polymeric material.

The objects of this invention are accomplished in a mold for casting foamed urethane plastics material for foam plastics articles having at least one generally flat surface and being fully finished on all sides comprising, in combination, a mold box having a generally flat upper surface provided with a recess extending downwardly through said surface to define a generally open and unobstructed aperture in said flat upper surface forming a cavity contoured to define the article to be molded and generally flat lid extending across said aperture for containing the plastics material within said cavity during foaming and rise thereof together with a breathable release sheet extending across said aperture and across said cavity beneath said lid closing said cavity to fully define the article to be molded, said breathable release sheet consisting of a layered structure comprising, in turn, a self-supporting paper support layer having sufficient strength and rigidity to be self-supporting across said aperture with sagging into said cavity or wrinkling during rise of such plastics material and exhibiting sufficient gas porosity to enable complete venting of such cavity through said release sheet outwardly between said mold box and said lid during foaming of urethane plastics material deposited therein in an uncreamed state while precluding exudation of such material therethrough and a release material layer coated to at least the surface thereof toward said mold box to prevent adherence to such foam, so that the gas porosity of said sheet is substantially unencumbered by said release coating, to enable the production of a finished flat surface thereagainst accurately reproducing the texture of said release sheet without flaws or voids caused by trapped air, wrinkles, and the like, by the improvement comprising a rigid insert releasably attached to the generally flat lid through the breathable release sheet for providing additional support to the breathable release sheet and with said rigid insert later becoming an integral part of the molded article.

The objects of this invention are further accomplished by a method for making an article such as a chair seat or the like, said method comprising:
  a. attaching a rigid insert to the first half of a mold, said rigid insert being of the general shape of, but smaller than, the article to be produced, and said rigid insert and said first half of the mold having an air permeable material extending from between them outward toward the edges of the first half of the mold;
  b. inserting a liquid foamable reaction mixture into the cavity of a second half of a mold, said cavity being of the shape of the article being produced;
  c. placing the two molded halves together with the air permeable material extending from the cavity of the mold to the exterior thereof;
  d. allowing the reaction mixture cure and form a rigid hard structure throughout while expanding around the sides of the rigid insert; and
  e. removing the finished article from the mold.

In one embodiment of this invention, the rigid insert is attached to the first half of the mold by attachment means which are later useful in attaching appendages, such as chair legs, to the article produced. One of the more practical embodiments of this invention is one in which the air permeable material extends between the first half of the mold and the rigid insert and the rigid insert is attached to the first half of the mold through the air permeable material. While many of the well known and equivalent air permeable materials may be useful in this invention, such as hardened cloth materials and the like, the preferable air permeable material for use in this invention is paper. Unlike the material used in U.S. Pat. No. 3,844,523, the air permeable material of this invention need not be so rigid as to keep it from sagging if used across the entire cavity since it is supported by the rigid insert. Additionally, the air permeable material need not be continuous entirely over the lid, but can have gaps or be discontinuous on that portion covered by the rigid insert.

The method of this invention is enhanced when, prior to the insertion of the liquid foamable reaction mixture into the cavity of the second half of the mold, the cavity of the second half of the mold is coated with a release agent. This release agent is preferably a coloring or finishing agent of a nature that enables it to release from the mold and attach to the article being formed, acting as a decorative surface thereon, such as a painted surface or the like.

While many of the commonly used foam materials may be utilized in this invention, such as polyolefin foams, polystyrene foams, polyester foams, and polypropylene foams, it is preferred to use a polyurethane foam prepared by mixing a polyol with a surfactant, catalyst, and a blowing agent, such as water.

While any type of rigid material that adds sufficient strength to the chair seat or the like can be utilized as a rigid insert in the method of this invention, it has been found that fiberboard of a sufficient thickness to be rigid provides an excellent system of good strength and low cost.

The method of this invention produces an item such as a chair seat which has the strength or essentially the strength of hard wood and which also can have the appearance of hardwood if prepared and coated properly.

BRIEF DESCRIPTION OF THE DRAWINGS

This invention may be more fully described, but is not limited by the attached drawings wherein.

DESCRIPTION OF THE PREFERRED EMBODIMENTS

Figure 1:
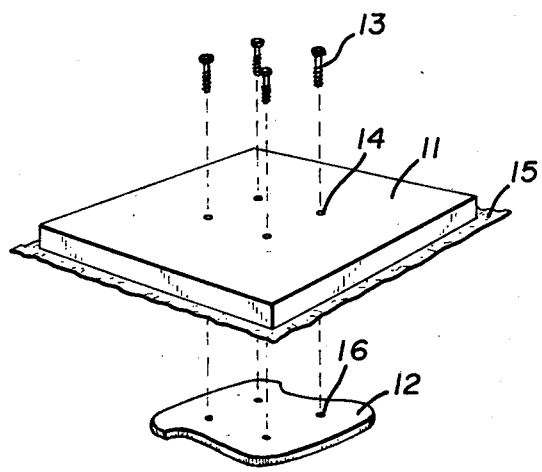
FIG. 1 is a perspective view of the top half of the mold with the air permeable material in place and showing the attachment of the rigid insert to the top half of the mold.
Figure 2:
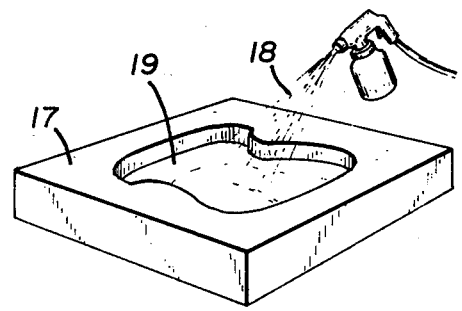
FIG. 2 is a perspective view showing the coating of the cavity of the second half of the mold.
Figure 3:
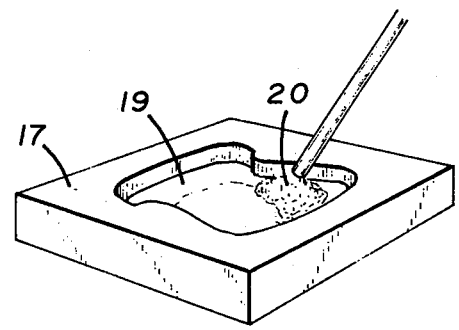
FIG. 3 is a perspective view showing the insertion of the foamable reaction mixture into the cavity of the second half of the mold.
Figure 4:
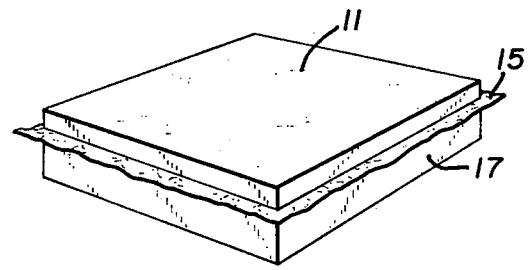
FIG. 4 is a perspective view of the closed mold.
Figure 5:
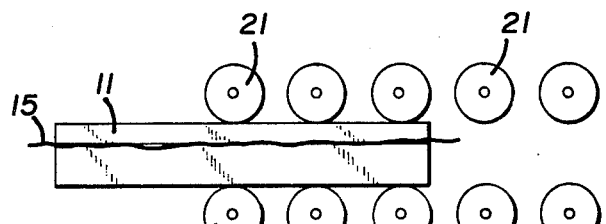
FIG. 5 is a side view of a clamping system for holding the mold halves together while the foamable reaction mixture expaned and cures.
Figure 6:
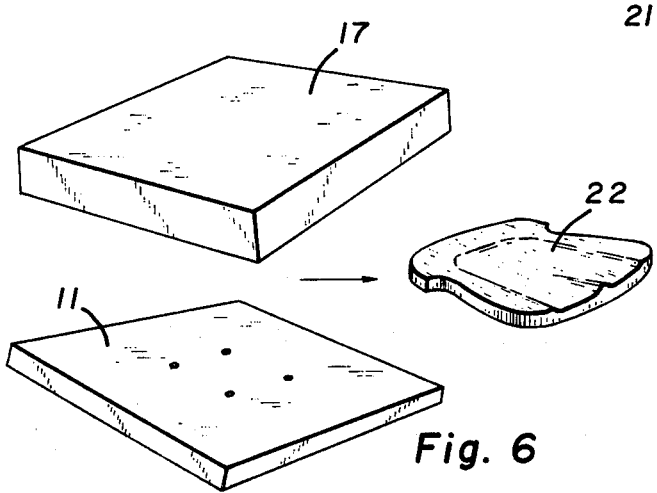
FIG. 6 is a perspective view showing the removal of the finished chair seat or the like from the mold.

This invention may be more fully described by reference to the attached drawings and the discussion hereinafter wherein Numeral 11 indicates the first half of the mold. A rigid insert 12 is attached to the mold by screws 13 extending holes 14 in the top of the mold and through the air permeable material 15 and secured to the rigid insert by nuts or the like 16 which have been embedded into the rigid insert. The second half of the mold 17 is then preferably sprayed with a coating release agent 18 which coats the cavity 19 thereof. A foamable reaction mixture 20 is then inserted into the cavity and the first half of the mold is then placed onto the second half of the mold. The mold is clamped together in order to secure the mold halves firmly together and thereby compressing the air permeable material, but not to the extent that gases can escape therethrough, and this clamping is maintained until the foamable reaction mixture expands up and around the rigid insert curing and forming a rigid hard structure throughout. For purposes of illustration, this clamping is shown as a series of rollers 21, spring loaded a distance apart slightly less than the height of the mold, and which move in order to move the loaded mold down a conveyor system as it is clamped together during curing. After sufficient time has elapsed, depending upon the foamable reaction mixture used, then the mold halves are separated and the finished chair seat or the like 22 is removed therefrom.

While the foamable reaction mixture of this invention may be any of the well known materials, it has been found particularly desirable that such a system be a polyurethane well known in the industry and including those formed by polyols reacted with isocyanates, catalysts, surfactants, and a blowing agent. Diphenyl methane diisocyanate is particularly useful with most polyols, and it has been found that an amine catalyst is also highly desirable in producing the strength characteristics in the latter product. For use in making chair seats, water appears to be a sufficient blowing agent for use with the above-described compositions.

The coating agent that is preferably used for coating the second mold half cavity prior to placing the expansion mixture therein can be any of the well known coating and barrier agents that are commercially available, including the nitrocellulose lacquers and the acrylic paint-type products.

The air permeable material, with its location between the mold halves, provides for the escape of air or gaseous reaction products without the escape of the expanding, curing foamable reaction mixture. Since the air is completely removed thereby, and since no material is removed due to the escape of air, no trimming is necessary on the product itself. In other words, the finished product, with the coating spray, exits ready for use. Additionally, since the gaseous reaction products are removed from the cavity, they are not retained in the product to provide resiliency which, in the case of chair seats, would cause weakness within the seat.

It has been found that the above-described method produces a chair seat which approaches hardwood in strength and which, if proper coatings are used, also approaches the appearance of a hardwood chair seat. Additionally, the product is low cost in comparison to hardwoods which are in short supply, and the product can be readily produced in assembly line production without the necessary carving and forming techniques that are extensive and expensive in the formation of carved hardwood surfaces. Still further in addition, the product produced by this invention is one which can be formulated to be resistant to stains and to maltreatment, such as exposure to burning cigarettes and the like. It may be seen, therefore, that the new and novel method of this invention produces a new and novel system for providing a simulated hardwood chair seat or the like and that the method is superior to any prior known method for producing such articles. As such, this method has created a significant advance in the industry of preparation of chair seats and the like.

Having fully described this new and unique invention, the following is claimed:

1. A method for making composite rigid foamed article such as a chair seat or the like, said method comprising:
   a. attaching a rigid insert to the first half of a mold with a sheet of air permeable material sandwiched therebetween, said rigid insert being of the general shape of, but smaller than, the article to be produced in order to allow the forming of a resin material around the insert without the insert showing on the finished side of the design and with the design providing for maximum strength contribution from the insert, and said rigid insert and said first half of the mold having said sheet of air permeable material extending from between them outward past the edges of the first half of the mold said sheet of air permeable material having a sufficiently porous structure to allow a gas to pass therethrough even when the material is under compression;
   b. introducing a liquid foamable resin reaction mixture into the cavity of a second half of a mold said mixture being capable of foaming and curing to form a rigid supporting form, and said cavity being of the shape of the article being produced;
   c. placing the two mold halves together with the air permeable material extending from the cavity of the mold to the exterior thereof thereby forming a passage way for reaction gases to leave the mold;
   d. permitting said liquid foamable resin reaction to foam and cure and form a rigid hard cellular structure throughout while expanding around the sides of the rigid insert while at the same time preventing the resin from binding to the air permeable material, and while allowing expansion and reaction gases to pass from the mold by passing through the passageway created by the air permeable material; and
   e. removing the finished article from the mold.

2. A method as in claim 1 wherein the rigid insert is attached to the first half of the mold by attachment means later useful in attaching appendages to the article produced.

3. A method as in claim 1 wherein the air permeable material extends between the first half of the mold and the rigid insert, and the rigid insert is attached to the mold through the air permeable material.

4. A method as in claim 1 wherein the air permeable material is paper.

5. A method as in claim 1 wherein prior to insertion of the liquid foamable resin reaction mixture into the cavity of the second half of the mold, the cavity is coated with a release agent.

6. A method as in claim 2 wherein the release agent attaches to the article being formed and acts as a decorative surface thereon.

7. A method as in claim 1 wherein the liquid foamable resin reaction mixture is foamable polyurethane resin reaction mixture.

8. A method as in claim 1 wherein the rigid insert is fiberboard.

* * * * *